United States Patent [19]

Ogino et al.

[11] Patent Number: 4,740,942

[45] Date of Patent: Apr. 26, 1988

[54] RECORD CONFIRMATION APPARATUS

[75] Inventors: Yasuo Ogino, Yokohama; Yasuaki Imai, Tokyo, both of Japan

[73] Assignees: Canon Kabushiki Kaisha, Tokyo; Canon Denshi Kabushiki Kaisha, Chichibu, both of Japan

[21] Appl. No.: 689,156

[22] Filed: Jan. 7, 1985

[30] Foreign Application Priority Data

Jan. 11, 1984 [JP] Japan .................................. 59-1821

[51] Int. Cl.$^4$ .................... G11B 20/18; G11B 7/14; G11B 27/36; G11B 19/14
[52] U.S. Cl. .................................... 369/48; 369/54; 369/58; 360/53
[58] Field of Search ................ 369/54, 58, 53, 59, 369/60, 32, 48; 360/25, 31, 53, 15, 75, 78

[56] References Cited

U.S. PATENT DOCUMENTS

| | | | |
|---|---|---|---|
| 2,774,056 | 12/1956 | Stafford et al. | 360/15 |
| 3,805,284 | 4/1974 | Coon, Jr. et al. | 360/15 |
| 4,225,873 | 9/1980 | Winslow | 369/54 |
| 4,375,091 | 2/1983 | Dakin et al. | 369/32 |
| 4,488,277 | 12/1984 | McFarlane et al. | 369/54 |
| 4,578,721 | 3/1986 | Brannan, Jr. | 360/53 |
| 4,602,301 | 7/1986 | Saito et al. | 360/75 |

FOREIGN PATENT DOCUMENTS

54-109403 8/1979 Japan ..................................... 369/60

Primary Examiner—Raymond F. Cardillo
Assistant Examiner—Steven R. Garland
Attorney, Agent, or Firm—Fitzpatrick, Cella, Harper & Scinto

[57] ABSTRACT

A record confirmation apparatus comprises a recording device for recording information on a disc-like record bearing member rotated at a predetermined angular speed, in accordance with a writing signal, a reproducing device disposed at a predetermined distance from the recording device in the tangential direction of the record bearing member for reproducing the recorded information as a read-out signal, and a comparing device for delaying the writing signal and comparing it with the read-out signal, the comparing device having a variable delay circuit for varying the delay time in conformity with the relative position of the recording device and the reproducing device relative to the record bearing member in the radial direction of the record bearing member.

4 Claims, 6 Drawing Sheets

RECORD CONFIRMATION APPARATUS

BACKGROUND OF THE INVENTION

1. Field of the Invention

This invention relates to a record confirmation apparatus, and more particularly to a record confirmation apparatus suitably applicable to a recording-reproducing apparatus using a disc-like record bearing member such as an optical disc.

2. Description of the Prior Art

In an information recording-reproducing apparatus, the following systems are known as a system for recording information on a record bearing member such as an optical disc and judging whether the information has been accurately recorded. A first system is such that as soon as a writing signal is stored in a memory, the writing signal is recorded on a track of the record bearing member, whereafter the same track is scanned to read out the recorded information and this read-out signal is compared with the writing signal stored in the memory, thereby judging whether the information has been accurately recorded. In this system, however, a memory of huge capacity is necessary and there is an inconvenience that much time is required for the confirmation of the record because the same track is scanned twice. There is also known a system in which, to decrease the storage capacity of the memory, the above-desscribed operation is effected for each of of several sectors into which a track is divided, but again in this system, it is necessary to scan the same track as frequently as double the number of sectors and therefore, much time has been required for the confirmation of the record.

Figure 1:
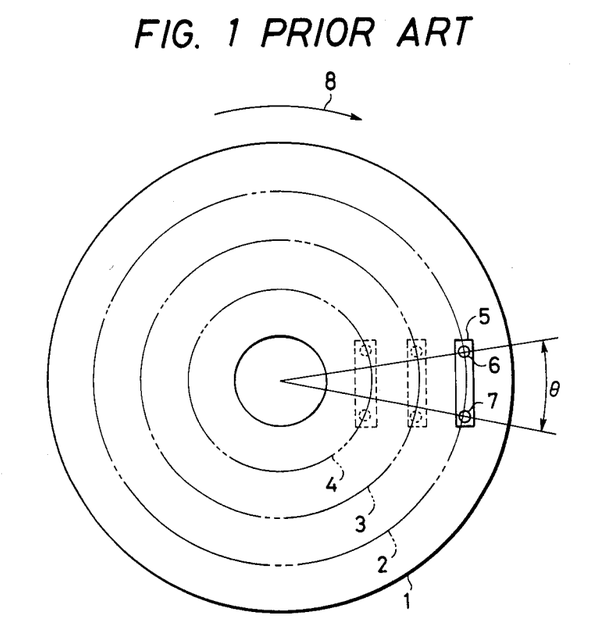
FIG. 1 is a plan view of a record bearing member illustrating the confirming operation in a record confirmation apparatus according to the prior art.
Figure 2:
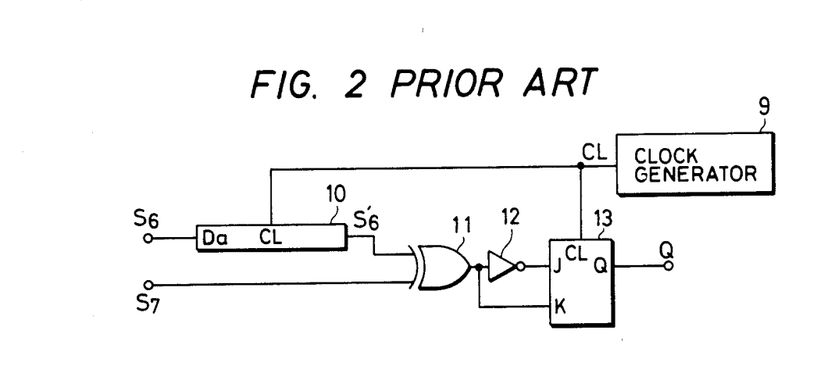
FIG. 2 is a block diagram showing an example of the circuit construction in the record confirmation apparatus according to the prior art.
Figure 3A:
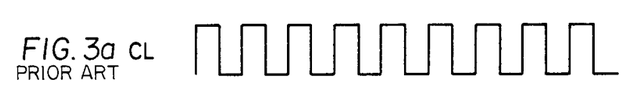
Figure 3B:
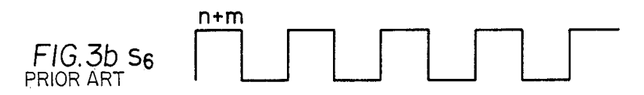
Figure 3C:
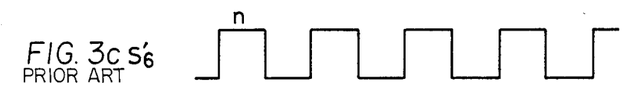
Figure 3D:
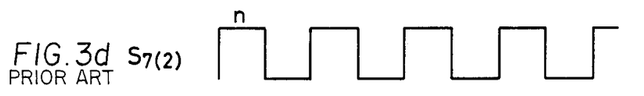
Figure 3E:
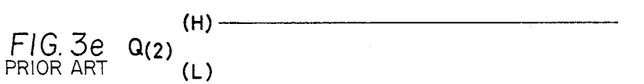
Figure 3F:
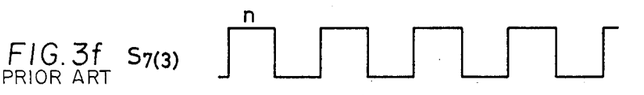
Figure 3G:
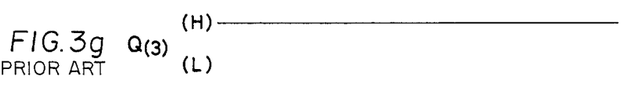
Figure 3H:
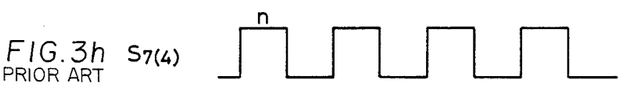
Figure 3I:
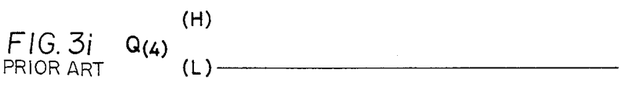

Also, in an information recording-reproducing apparatus which has recording means and reproducing means discretely, there is a record confirmation apparatus as shown in FIGS. 1 and 2 of the accompanying drawings. In FIG. 1, reference numeral 1 designates a record bearing member such as an optical disc, and reference numerals 2, 3 and 4 denote recording tracks, of which the outermost track is designated by 2. Reference numeral 5 designates an optical head, reference numeral 6 denotes a writing beam spot, reference numeral 7 designates a reading-out beam spot, and reference numeral 8 indicates the direction of rotation of the record bearing member 1. $\theta$ is the angle formed by the writing beam spot 6 and the reading-out beam spot 7 with respect to the center of the record bearing member when the optical head 5 lies on the outermost track 2. At this time, the reading-out beam spot 7 is spaced apart from the writing beam spot 6 by an amount corresponding to $(m+\frac{1}{2})$ bits. In FIG. 2, reference numeral 9 designates a clock generator, reference numeral 10 denotes an m-bit shift register, reference numeral 11 designates an exclusive OR gate, reference numeral 12 denotes an inverter, and reference numeral 13 designates a JK flip-flop. The m-bit shift register 10, the exclusive OR gate 11, the inverter 12 and the JK flip-flop 13 together constitute comparing means.

Operation will now be described. FIG. 3 is a timing chart. The writing signal $S_6$ is latched in the m-bit shift register 10 by the falling of a first clock signal CL with a time delay of $\frac{1}{2}$ bit. Accordingly, the writing signal $S_6$ is put out to $S_6'$ of $(m+\frac{1}{2})$ bits after it has been recorded on the record bearing member. At this time, the reading-out beam spot 7 reads the information $S_7(2)$ before $(m+\frac{1}{2})$ bits of time as previously described. When the information is accurately recorded, the output of the exclusive OR gate 11 to which $S_6'$ and $S_7(2)$ are input becomes LOW and the J terminal of the JK flip-flop 13 assumes HIGH and the K terminal of the JK flip-flop 13 assumes LOW, and this flip-flop 13 is latched by the rising of the first clock signal CL and the output Q thereof becomes HIGH. Also, when the information is not accurately recorded on the record bearing member, the output Q becomes LOW.

However, when the recording frequency and the angular speed of the record bearing member 1 are constant, the number of bits existing between the writing beam spo 6 and the reading-out beam spot 7 becomes greater as the optical head 5 moves to the inner track and thus, a bit delay is created in the read-out signal $S_7$. That is, when the optical head 5 lies on the track 3 and where the information is accurately recorded on the record bearing member, signals input to the exclusive OR gate 11 are $S_6'$ and $S_7(3)$ and, in this case, the output Q(3) becomes HIGH, but when the optical head 5 lies on the track 4 in which the output signal $S_7(4)$ is delayed relative to the writing signal $S_6$ by $(m+1)$ bits, even where the information is accurately recorded on the record bearing member, the output Q(4) becomes LOW and the confirmation of the record becomes impossible. This has led to an inconvenience that the width of the track area which can be recorded on the record bearing member becomes very narrow.

SUMMARY OF THE INVENTION

It is an object of the present invention to provide a record confirmation apparatus in which the confirmation of recorded information is possible over a wide area of a record bearing member and moreover the time required for the confirmation of the record is short.

The above object of the present invention is achieved by the record confirmation apparatus being comprised of recording means for recording information on a disc-like record bearing member rotated at a predetermined angular speed, in accordance with a writing signal, reproducing means disposed at a predetermined distance from said recording means in the tangential direction of the record bearing member for reproducing said recorded information as a read-out signal, and comparing means having a variable delay circuit for varying the delay time in conformity with the relative position of said recording means and said reproducing means relative to the record bearing member in the radial direction of the record bearing member, said comparing means being adapted to delay said writing signal and comparing it with said read-out signal.

BRIEF DESCRIPTION OF THE DRAWINGS

FIGS. 3(a) to 3(i), respectively, are elements of a timing chart showing signals in various portions of the circuit shown in FIG. 2.

DESCRIPTION OF THE PREFERRED EMBODIMENT

Figure 4:
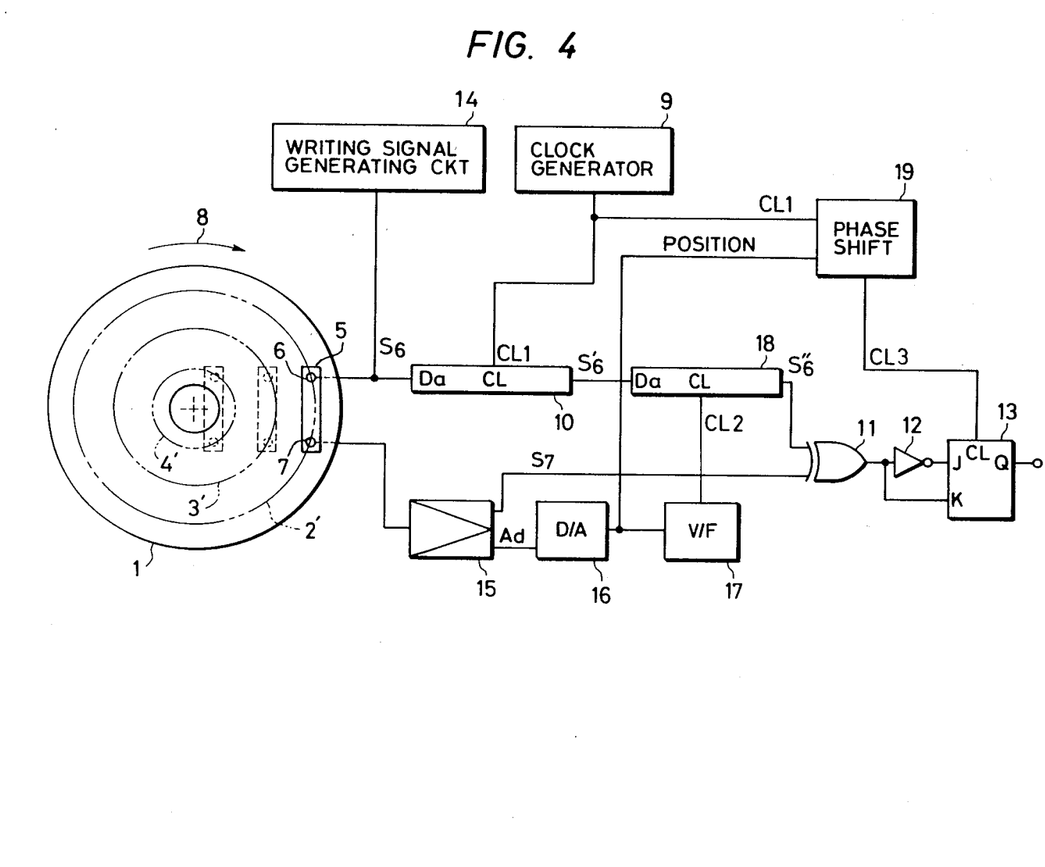
FIG. 4 is a schematic view showing the construction of an embodiment of the record confirmation apparatus of the present invention.

An embodiment of the present invention will hereinafter be described specifically and in detail by reference to the drawings. In FIG. 4 which shows an embodiment of the present invention, members common to those in FIGS. 1 and 2 are given similar reference characters. In FIG. 4, reference numeral 1 designates a record bearing member, reference numerals 2', 3' and 4' denote information recording tracks, reference numeral 5 designates an optical head, reference numeral 6 denotes a writing beam spot, reference numeral 7 designates a reading beam spot, reference numeral 8 indicates the direction of rotation of the record bearing member, reference numeral 9 denotes a clock generator for generating a first clock signal CL1, reference numeral 10 designates an (m−1) bit shift register for receiving a writing signal $S_6$ as an input and converting this signal $S_6$ into a signal $S_6'$ shifted by (m−1) bits, reference numeral 11 denotes an exclusive OR gate, reference numeral 12 designates an inverter, reference numeral 13 denotes a JK flip-flop, reference numeral 14 designates a writing signal generating circuit, and reference numeral 15 denotes a separating circuit for transforming a read-out signal into a binary form and separating an address signal Ad and an RF signal $S_7$. The signal $S_7$ and the address signal Ad are put out from the separating circuit 15. Position detecting means is formed by the optical head 5 and the separating circuit 15. The address signal Ad is input to a digital-analog (D/A) converter 16 which is converting means and is converted into a voltage level. Reference numeral 17 designates a voltage control oscillator (VCO) circuit for generating a second clock signal CL2 in response to the output signal of the D/A converter 16, and reference numeral 18 denotes a 5-bit shift register for shifting the phase of the writing signal $S_6'$ with the second clock signal CL2 as a clock input and obtaining an output signal $S_6''$. Reference numeral 19 designates a phase shift circuit which is phase control means for shifting the phase of the first clock signal CL1 in response to the output signal of the D/A converter 16 and making the first clock signal into a third clock signal. The output $S_6''$ of the 5-bit shift register 18 and the read-out signal $S_7$ are input to the exclusive OR gate 11.

Figure 5:
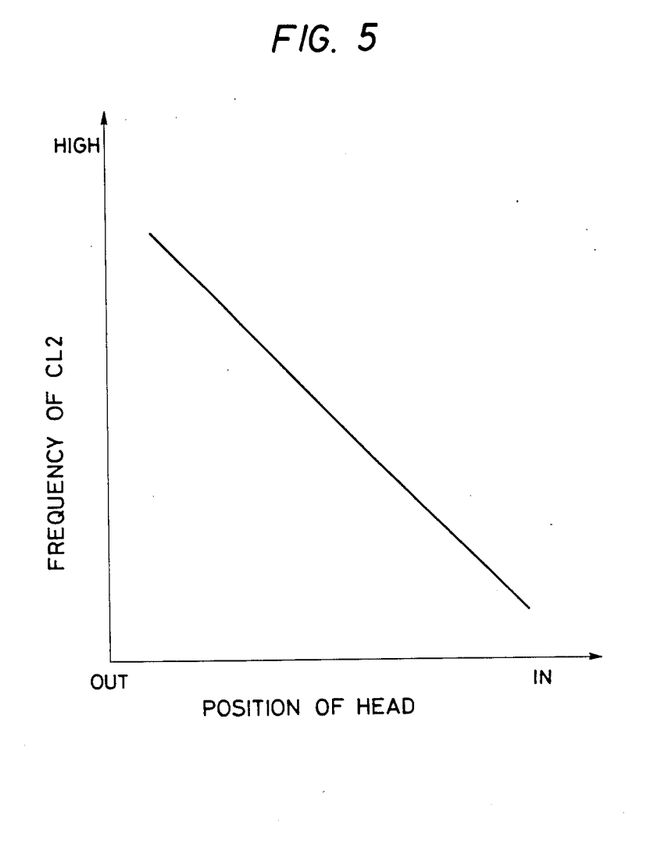
FIG. 5 is a characteristic graph of the VCO circuit of FIG. 4.

FIG. 5 is a characteristic graph of the VCO circuit 17, in which the abscissa represents the position of the optical head 5 and the ordinate represents the frequency of the second clock signal CL2. As shown in FIG. 5, as the optical head 5 approaches the inside of the recording medium 1, the frequency of the second clock signal CL 2 decreases linearly.

Figure 6:
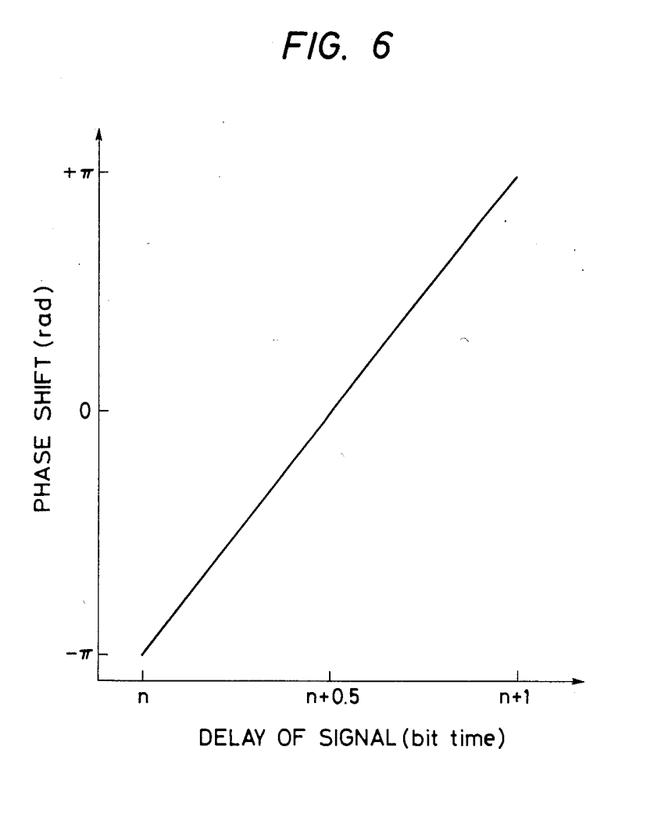
FIG. 6 is a characteristic graph of the phase shift circuit of FIG. 4.

FIG. 6 is a characteristic graph of the phase shift circuit 19, in which the abscissa represents the time delay of the read-out signal $S_7$ relative to the writing signal $S_6$ in bit time and n is an arbitrary integer. The ordinate represents the amount of phase shift of the third clock signal CL3 relative to the first clock signal CL1 in radian, and as shown in FIG. 6, when the read-out signal $S_7$ has a bit delay of n bits relative to the writing signal $S_6$, a phase difference of $-\pi$ is created in the third clock signal CL3 relative to the first clock signal CL1, and when there is a bit delay of n+0.5 bits, there is no phase difference, and when there is a time delay of n+1 bits, a phase difference of $\pi$ is created.

Figures 7A, 7R:
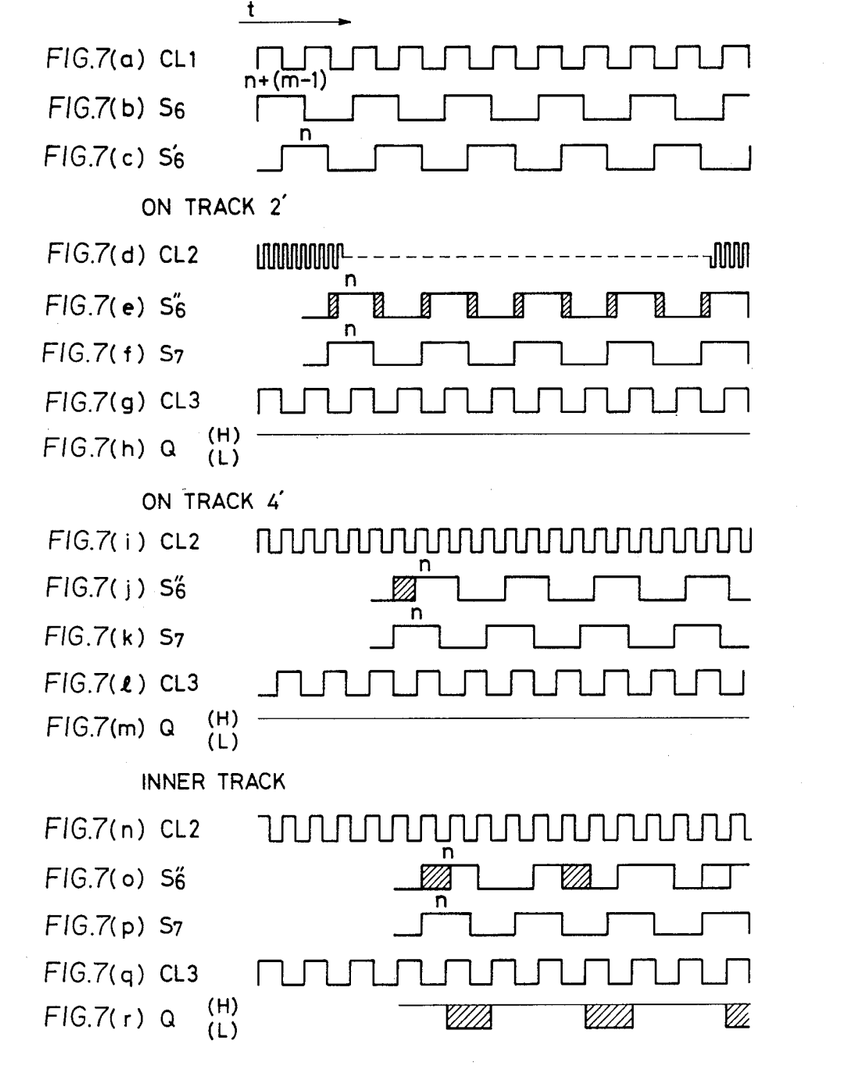
FIGS. 7(a) to 7(r) are elements of a timing chart showing signals in various portions of the apparatus shown in FIG. 4.

Operation of the present embodiment will now be described. FIG. 7 is a timing-chart of the present embodiment. FIG. 7(a) shows the first clock signal CL1 generated by the clock generator 9, and FIG. 7 (b) shows the writing signal $S_6$. The writing signal $S_6$ is recorded on the record bearing member 1 by the writing beam spot 6 and simultaneously therewith, it is latched into the (m−1) bit shift register 10 by the falling of the first clock signal CL1. The first clock signal CL1 is synchronized with the writing signal $S_6$ and therefore, when the writing signal $S_6$ is outputting the n+(m−1)th bit information, the output $S_6'$ of the (m−1) bit shift register 10 puts out the nth bit information with a time delay of ½ bit.

When the optical head 5 lies on the track 2', the address signal put out from the separating circuit 15 is input to the phase shift circuit 19 through the D/A converter 16, but the reading-out beam spot is positioned away from the writing beam spot by (m+½) bits and the read-out signal $S_7$ has a time delay of (m+½) bits relative to the writing signal $S_6$. Therefore, as shown in FIG. 6, the amount of phase shift of the third clock signal CL3 relative to the first clock signal CL1 becomes 0. Also, the optical head 5 is outside the recording medium 1 as shown in FIG. 5 and thus, the second clock signal CL2 generated by the VCO circuit 17 has a high frequency. Thus, the second clock signal CL2, the output signal $S_7$ and the third clock signal CL3 are as shown at FIGS. 7(d), 7(f) and 7(g) respectively. The 5-bit shift register 18 latches the input signal $S_6'$ by the rising of the second clock signal CL2 and thus, the output signal $S_6''$ has uncertain portions as indicated by hatching in the rising portions and the falling portions of the pulse, as shown in FIG. 7(e). After the signal $S_6''$ and the signal $S_7$ have been input to the exclusive OR gate 11, these signals are latched by the JK flip-flop 13 at the rising of the third clock signal CL3, but since the rising of the clock pulse CL3 corresponds to the middle of the bits of the signals $S_6''$ and $S_7$, the output signal Q is not affected by the uncertain portions of the signal $S_6''$ and becomes HIGH whenever the writing signal $S_6$ is accurately recorded on the record bearing member 1, and becomes LOW when the writing signal $S_6$ is not accurately recorded on the record bearing member 1.

When the optical head 5 lies on the track 4', the read-out signal $S_7$ further has a time delay of 1.4 bits relative to the writing signal $S_6$, as compared with the time when the optical head lies on the track 2'. That is, the read-out signal $S_7$ has a time delay of (m+½)+1.4=(m+1)+0.9 bits relative to the writing signal $S_6$ and therefore, as shown in FIG. 6, the amount of phase shift of the third clock signal CL3 relative to the first clock signal CL1 is about 0.8$\pi$(rad) and further, since the optical head 5 is inside the record bearing member 1 as shown in FIG. 5, the second clock signal CL2 generated by the VCO circuit 17 is a pulse of low frequency. Thus, the second clock signal CL2, the output signal $S_7$ and the third clock signal CL3 are as shown at FIGS. 7(i), 7(k) and 7(l) respectively. The 5-bit shift register 18 latches the input signal $S_6'$ at the rising of the second clock signal CL2 and therefore, the output signal $S_6''$ is as shown in FIG. 7 (j). The rising of the third clock signal CL3 corresponds to the middle portion of the signal $S_7$ and the HIGH portion of the signal $S_6''$ and therefore, reading of the output signal Q becomes possible.

Assuming that the optical head 5 further moves to the inner track and the read-out signal S7 has a time delay of $(m+\frac{1}{2})+1.5=(m+1)+1$ bits relative to the writing signal S6, it follows from FIG. 6 that the amount of phase shift of the third clock signal CL3 relative to the first clock signal CL1 is $\pi$ (rad), and as shown in FIG. 5, the second clock signal CL2 generated by the VCO circuit 17 becomes lower in frequency than when the optical head 5 lies on the track 4', and the period of the second clock signal CL2 becomes longer than $\frac{1}{2}$ of the bit period. Thus, the second clock signal CL2, the output signal S7 and the third clock signal CL3 are as shown at FIGS. 7(n), 7(p) and 7(q) respectively. The 5-bit shift register 18 latches the input signal S6" at the rising of the second clock signal CL2 and therefore, the output signal S6" is as shown at FIG. 7 (o) and has uncertain portions indicated by hatching. However, the rising of the third clock signal CL3 corresponds to the middle portion of the signal S7 but overlaps the uncertain portion relative to the signal S6" and therefore, an unstable portion is also created in the output signal Q and the confirmation of the record becomes impossible, but a stable output signal Q can be detected to enable the confirmation of the record to be accomplished by increasing the number of bits of the 5-bit shift register 18 and enhancing the frequency of the second clock signal CL2 or moving the latch timing of the JK flip-flop 13 to the second half of the bit period.

The present invention is not restricted to the above-described embodiment, but various applications thereof are possible. For example, in the above-described embodiment, the address of a track is used as the optical head position detecting means, but it is also possible to detect the position of the optical head by a potentiometer mechanically associated with the optical head. Also, the above-described embodiment is designed such that the time delay of the read-out signal on the outermost track relative to the writing signal is compensated for by the shift register 10 and the time delay of the read-out signal relative to the writing signal which occurs when the optical head 5 moves from the outermost track to the innermost track is compensated for by the shift register 18, but a construction in which the shift register 10 is eliminated, the number of bits of the shift register 18 is increased, the frequency of the second clock signal CL2 is enhanced and the time delay is compensated for by only the shift register 18 or a construction in which the time delay of 1 bit unit is compensated for by the shift register 10 and the time delay within 1 bit is compensated for by the shift register 18 is also possible.

What is claimed is:

1. A record confirmation apparatus comprising:
   recording means for recording information on a disc-like record bearing member rotatable at a predetermined angular speed, in accordance with a writing signal;
   reproducing means disposed at a predetermined distance from said recording means in a tangential direction of said record bearing member for reproducing said recorded information as a read-out signal;
   position detecting means for detecting a relative position of said recording and said reproducing means relative to said record bearing member in a radial direction of said record bearing member to output a position signal;
   a variable delay circuit for delaying said writing signal by a time in accordance with the position signal representing the relative position detected by said position detecting means, said variable delay circuit comprising converting means for converting the position signal from said position detecting means into a voltage signal to output said voltage signal, a voltage controlled oscillator circuit for generating a second clock signal in response to the voltage signal froms said converting means, and a shift register for shifting a phase of said writing signal with said second clock signal a a clock input to output a shifted writing signal; and
   comparing means for comparing said writing signal delayed by said variable delay circuit, with said read-out signal.

2. A record confirmation apparatus according to claim 1, wherein said position detecting means comprises means for reading out an address signal of a track being written from said record bearing member.

3. A record confirmation apparatus according to claim 1, wherein said recording means and said reproducing means comprise in common an optical head for applying a writing bean and a reading-out beam to said record bearing member.

4. A record confirmation apparatus according to claim 1, wherein said comparing means comprises a clock generator for generating a first clock signal indicative of a timing of said writing signal, phase control means for shifting a phase of said first clock signal in accordance with the position signal from said position detecting emans to make said first clock signal into a third clock signal, and a comparing circuit for comparing the shifted writing signal from the shift register of said variable delay circuit with said read-out signal with said third clock singal as a clock input.

* * * * *

UNITED STATES PATENT AND TRADEMARK OFFICE
CERTIFICATE OF CORRECTION

PATENT NO. : 4,740,942
DATED : April 26, 1988
INVENTOR(S) : YASUO OGINO, ET AL.

It is certified that error appears in the above-identified patent and that said Letters Patent is hereby corrected as shown below:

Column 2, line 12, "spo" should read --spot--.

Column 5, line 14, "$S_6$" should read --$S_{6'}$--.

Column 6, line 25, "froms" should read --from--;

line 47, "emans" should read --means--;

line 51, "singal" should read --signal--.

Signed and Sealed this

Sixteenth Day of August, 1988

Attest:

DONALD J. QUIGG

*Attesting Officer*  *Commissioner of Patents and Trademarks*